United States Patent [19]

Carson

[11] 4,428,201
[45] Jan. 31, 1984

[54] POWER GENERATION WITH FRACTIONATOR OVERHEAD VAPOR STREAM

[75] Inventor: Don B. Carson, Mt. Prospect, Ill.

[73] Assignee: UOP Inc., Des Plaines, Ill.

[21] Appl. No.: 394,375

[22] Filed: Jul. 1, 1982

[51] Int. Cl.³ ............................................. F01K 17/00
[52] U.S. Cl. .................................... 60/648; 60/676; 203/DIG. 20; 208/365
[58] Field of Search ................. 60/648, 676, 651, 671; 203/DIG. 20, 87; 208/353, 365

[56] References Cited

U.S. PATENT DOCUMENTS

| | | | |
|---|---|---|---|
| 3,254,024 | 5/1966 | Huckins, Jr. et al. | 208/354 |
| 3,265,590 | 8/1966 | Redcay | 203/21 |
| 3,367,846 | 2/1968 | Uitti et al. | 203/25 |
| 4,109,469 | 8/1978 | Carson | 60/676 |

Primary Examiner—Allen M. Ostrager
Assistant Examiner—Stephen F. Husar
Attorney, Agent, or Firm—James R. Hoatson, Jr.; John F. Spears, Jr.; William H. Page, II

[57] ABSTRACT

A method is disclosed for recovering useful energy from the overhead stream of a fractionation column. A high efficiency for the overall process is achieved by first removing heat from the overhead stream by vaporizing an expansion turbine working fluid stream and by then removing an additional amount of heat in a working fluid preheater. The amount of working fluid flowing through the preheater is more than is vaporized by exchange against the overhead stream. The remaining liquid-phase portion of the working fluid is separately passed into a second vaporizer having a different heat source.

12 Claims, 1 Drawing Figure

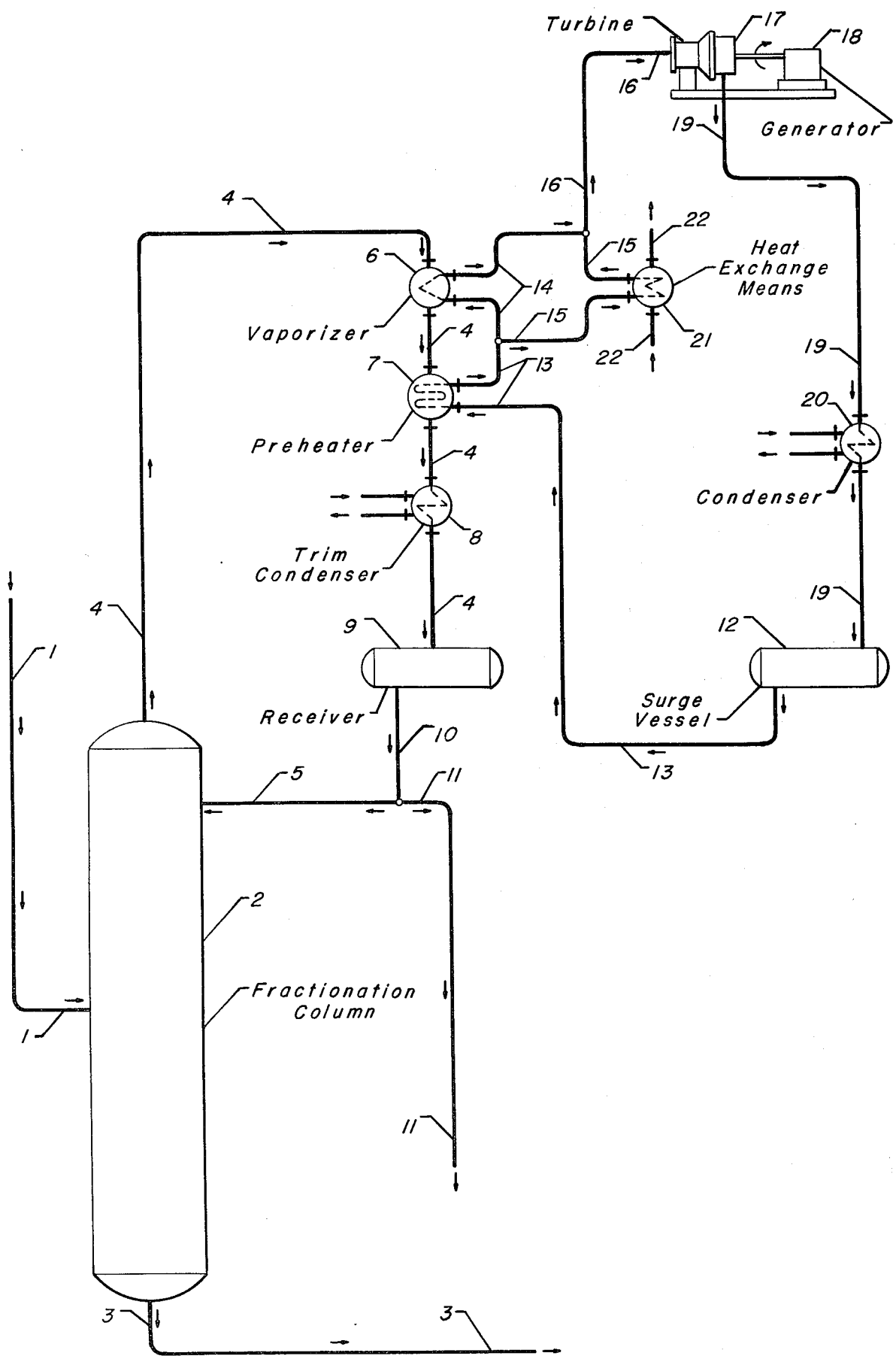

POWER GENERATION WITH FRACTIONATOR OVERHEAD VAPOR STREAM

FIELD OF THE INVENTION

The invention relates to the general area of power generation through the depressurizing of a heated working fluid in an expansion turbine. The invention also relates to the general area of the separation of chemical compounds, especially hydrocarbons, by the use of a fractionation column such as employed in many petroleum refining operations. The invention specifically relates to the recovery of heat energy present in the overhead vapor stream of a fractionation column and to the use of the recovered heat energy in the vaporization of a power cycle working fluid.

PRIOR ART

Fractionation columns are employed in essentially all petroleum refineries and petrochemical complexes to separate volatile chemical compounds by fractional distillation. Heat is supplied to the bottom of the fractionation column to produce vapors which rise through the column by the use of an indirect heat exchange means which is referred to as a reboiler. The reboiler may be stabbed into the bottom of the fractionation column proper but is more typically located outside of the column. A liquid stream referred to as the bottoms liquid stream is withdrawn from a lower portion of the fractionation column and divided into a first portion which is removed from the process as a product stream referred to as the net bottoms stream and a second portion which is passed into the reboiler for partial or total vaporization. The portion of the bottoms liquid stream which has passed through the reboiler is then returned to the bottom portion of the fractionation column. This manner of operation is well known to those familiar with fractionation processes.

U.S. Pat. No. 4,109,469 is directed to a process for power generation from petroleum refinery waste heat streams. A waste heat stream is a process stream which is at an elevated temperature which is normally considered too low for the commercially economical recovery of significant quantities of usable heat from the stream. That is, although this stream is at an above ambient temperture, it is not hot enough to serve as a useful heating medium within the process or to generate steam having a useful pressure. This reference is pertinent for its showing that a working fluid may be vaporized using heat available in a petroleum refinery and the working fluid vapor stream may then be depressurized through a turbine to generate electricity.

U.S. Pat. No. 3,265,590 issued to A. K. Redcay is pertinent for its teaching that the heat of the overhead vapor stream of a fractionation column may be used to vaporize water to produce useful industrial steam of pressure up to 785 psig. The heat exchanger used for this purpose is shown as functioning as the overhead condenser of the column. U.S. Pat. No. 3,367,846 issued to K. D. Uitti et al is also pertinent for teaching the condensation of overhead vapor by steam generation. This reference indicates at column 4 that excess steam produced in this manner may be employed to drive turbines.

BRIEF SUMMARY OF THE INVENTION

The invention provides a highly efficient method of recovering heat energy from the overhead vapor stream of a fractionation column. The recovered energy may then be utilized to produce mechanical or electrical energy by depressurization of a working fluid in an expansion turbine. Alternatively the vapor stream produced in the process may be used directly. The invention is an improvement over prior art systems which vaporized all of the coolant by heat exchange with the overhead stream.

A preferred embodiment of the invention may be characterized as a method of recovering energy from the overhead vapor stream of a fractionation column which comprises the steps of cooling the overhead stream by at least partially vaporizing a first turbine working fluid stream by indirect heat exchange in a first heat exchanger; removing an additional amount of heat from the overhead stream by heating a larger second turbine working fluid stream which comprises the first turbine working fluid stream by indirect heat exchange in a second heat exchanger; and depressurizing the first turbine working fluid stream in an expansion turbine.

BRIEF DESCRIPTION OF THE DRAWING

Referring now to the Drawing, a multi-component feed stream to the fractionation column is passed into the fractionation column 2 through line 1. This feed stream is therein separated, with the less volatile portion of the feed stream being withdrawn from the overall fractionation process through line 3 as a net bottoms stream. An overhead vapor stream comprising the more volatile components of the feed stream is withdrawn from the fractionation column in line 4 and passed into a first indirect heat exchanger 6 referred to as a vaporizer. The overhead vapor stream, which at this point may actually comprise a mixture of vapor and liquid, continues through line 4 through a second indirect heat exchange means 7 referred to as the preheater. The overhead stream, which preferably now is substantially all liquid, passes through an optional third indirect heat exchange means 8 referred to as a trim condenser and is then passed into the overhead receiver 9. Uncondensed gases may be withdrawn from the overhead receiver through a means not shown. A liquid phase stream comprising the overhead liquid is withdrawn from the overhead separator through line 10 and divided into a first portion removed as the net overhead product of the fractionation column carried by line 11 and a second portion which is passed into the fractionation column at an upper point through line 5 as reflux liquid for the column.

The energy removed from the overhead vapor stream in the heat exchange means 6 and 7 is transferred to a working fluid which circulates in a closed loop power generation cycle. A liquid phase stream of the working fluid is removed from the surge vessel 12 through line 13 and heated in the preheater 7. This liquid phase stream is then divided into at least two streams. The stream carried by line 14 is substantially vaporized in the vaporizer 6 and the stream passed through line 15 is substantially vaporized in a fourth indirect heat exchange means 21. Heat exchange means 21 receives its heat supply from a fluid stream carried by line 22. The resultant preferably totally vapor phase streams flowing through lines 14 and 15 are then combined by passage into line 16 and depressurized in an expansion turbine 17. The rotational energy produced in the turbine is transferred to an electrical generator 18 which produces electricity withdrawn from the power generation cycle. The expanded low pressure turbine effluent stream is passed into a condenser or fifth indirect heat exchange means 20 by line 19. The liquid phase effluent of the condenser is then returned to the surge vessel thereby completing the circulation of the working fluid through the power generation cycle.

DETAILED DESCRIPTION

The present high cost of all forms of energy has prompted many new developments in the area of energy conservation. This is especially true in the area of petroleum refining, which is a very energy-consuming industrial enterprise. A significant amount of the energy consumed in petroleum refineries and petrochemical plants is used during the fractionation of various multicomponent process streams. Although efforts have been made to reduce the heat required in operating fractionation columns and to recover useful heat from fractionation column effluent streams a large amount of heat is still lost during the fractionation process. Much of this lost heat is low level heat rejected to cooling water or to air used for cooling. It is an objective of the subject invention to provide a method of recovering heat from the overhead system of a fractionation column. It is a further objective of the invention to provide a more efficient method of vaporizing a liquid used in a power cycle.

In the subject process heat is removed from the overhead vapor stream of a fractionation column by passing the overhead vapor stream through two different indirect heat exchangers. These two indirect heat exchangers preferably function as the equivalent of the overhead condenser normally employed in fractionation column overhead systems. Although it is not preferred, an additional or third indirect heat exchange means may be employed to supplement the heat removal performed by the two heat exchangers of the subject process. This third heat exchanger would only be utilized in those instances in which there was a significant concern about the ability of the initial heat exchangers to remove a sufficient amount of heat at all times. The third or trim heat exchanger may also be useful during the startup of a fractionation column.

In the subject energy recovery and liquid vaporization methods the first indirect heat exchange means which the overhead vapor stream of the fractionation column passes through functions as a vaporizer for a fluid stream which receives the heat removed from the overhead vapor stream. That is, at least 75% of the heat transferred within this heat exchange means is utilized in the vaporization and superheating of the liquid which removes heat from the overhead vapor stream. Preferably all of the heat transferred in the vaporizer is utilized for the vaporization of this coolant stream and to superheat the coolant vapors.

The second indirect heat exchanger through which the overhead stream of the fractionation column passes is referred to as a preheater since it is the function of this heat exchanger to heat, with a minimum of vaporization, the coolant liquid to approximately the temperature at which it is subsequently vaporized in the vaporizer. The coolant is preferably a liquid stream upon leaving the preheater although depending on the design and operation of the heat exchanger, a small amount of vapor may be formed therein and become admixed with the warm fluid stream produced in the preheater. It is therefore preferred that less than 20 mole percent of the liquid entering the preheater as coolant is vaporized therein. More preferably less than 10 mole percent of the liquid entering the preheater as coolant is vaporized within the preheater. It is a specific preference that the liquid which enters the preheater as the coolant, or working fluid, is heated to a temperature within 15 Centigrade degrees of the temperature at which the coolant is subsequently vaporized in the vaporizer, with this temperature referring to the actual vaporization temperature rather than any temperature which results from the subsequent superheater of vapors formed in the vaporizer.

In the subject method, all of the overhead stream of the fractionation column passes through both the vaporizer and the preheater in series. However, not all of the coolant liquid which is heated in the preheater passes into the vaporizer. The warm liquid or mixed phase stream produced in the preheater is divided into two or more streams. Only one of these streams of the coolant is passed into the vaporizer. This stream preferably has a flow rate equal to between about one-quarter and about two-thirds of the total flow rate of the coolant liquid which passes through the preheater. The other stream or streams of the warmed coolant is passed through other indirect heat exchange means and preferably vaporized therein and possibly superheated to form vapor having approximately the same thermodynamic properties as the vapor stream produced in the vaporizer which receives heat from the overhead vapor stream. The heat required for the vaporization of this other stream of warmed fluid may be derived from a wide variety of sources. It is contemplated that this stream(s) may be heated by indirect heat exchange against the overhead vapor stream of a different fractionation column in a heat exchanger which functions similar to the vaporizer of the primary fractionation column. Other possible sources of heat for the vaporization of the diverted stream(s) include sidecut streams removed from fractionation columns, a net bottoms stream of a fractionation column, reaction zone effluent streams and heat removed from reaction zones or regeneration zones. The diverted portion of the warmed fluid stream may also be passed through a radiant and/or convective heating section of a fired process heater.

One embodiment of the subject invention may be characterized as a method of vaporizing a liquid stream which comprises the steps of heating a first liquid stream by indirect heat exchange against a hereinafter characterized warm fluid stream; dividing the first liquid stream into a second liquid stream and a third liquid stream; vaporizing substantially all of the second liquid stream by indirect heat exchange against the overhead vapor stream of a fractionation column, with the overhead vapor stream thereby being converted into the previously referred to warm fluid stream; and vaporizing substantially all of the third liquid stream by indirect heat exchange against a high temperature heat source other than the overhead vapor stream of the fractionation column.

The subject method may be utilized to vaporize water and thereby produce steam which may be put to any of the many various uses for steam such as heating, stripping catalyst in closed containers, reboiling fractionation columns or as the steam fed to steam distillation columns or to steam jet ejectors. Steam produced by the subject method may also be depressurized through a power recovery or expansion turbine for the generation of useful rotational energy used to drive a compressor or generate electrical energy.

There is no inherent limitation on the chemical composition of the liquid vaporized in the subject method. The inventive concept is therefore not limited to the vaporization of water and may be applied to the vaporization of a wide variety of materials which are used directly in their vaporous form or which are a working fluid which is continuously recycled through a power generation cycle. The method may therefore be applied to any chemical compound which satisfies the various requirements of an acceptable working fluid for such a process, such as the appropriate boiling point at a desired range of working pressures, thermal stability, noncorrosiveness, and low cost. The preferred working fluid in a power cycle will often depend on the temperature of the heat to be recovered in the vaporizer. Suitable working fluids normally include water and hydrocarbons, with light hydrocarbons containing from about 2 to about 7 carbon atoms per molecule being preferred. The hydrocarbons may be various cyclic compounds including benzene and toluene or paraffins and olefins such as ethane, propane, isobutane, normal butane, pentane, propylene and butylene. Isobutane is preferred in many cases. A mixture of hydrocarbons such as a mixture of propane and butane could also be used as the working fluid. Halogenated hydrocarbons containing fluorine and/or chlorine may also be employed in the subject process.

Although the vapors produced in the subject method may be employed for other purposes, it is preferred that this vapor is utilized as the motive fluid which is depresurized in an expansion turbine. This turbine is preferably utilized for the generation of electrical energy, but the turbine could alternatively be connected to a pump, compressor or other piece of rotating equipment as previously indicated. One embodiment of the invention may accordingly be characterized as a process for recovering energy from the overhead stream of a fractionation column which comprises the steps of heating a liquid phase feed stream of an expansion turbine working fluid by indirect heat exchange against the overhead stream of a fractionation column; dividing the thus-heated liquid phase feed stream of working fluid into a first stream and a second stream; vaporizing at least a portion of said first stream of working fluid by indirect heat exchange against the overhead stream of fractionation column at a point upstream in the flow of the overhead stream as compared to the indirect heat exchange step utilized to heat the liquid phase feed stream; and depressurizing the resultant vapor phase working fluid in an expansion turbine. It is especially preferred that the second stream of working fluid is vaporized by indirect heat exchange against a heat source other than the overhead stream of the fractionation column used to vaporize the first stream of working fluid and that the resultant vapor phase working fluid is then depressurized in the same expansion turbine as the vapor phase working fluid produced from said first stream of working fluid.

The subject invention may also be viewed as a process for producing useful energy wherein the overhead stream of the fractionation column serves as one of the heat sources in the process. When examined from this viewpoint, it may be noted that the overhead vapor stream supplies a portion of the energy used in vaporizing and possibly superheating the working fluid. Perhaps more importantly it may be noted that the overhead vapor stream supplies the heat required to preheat all of the working fluid stream. Therefore a very high percentage of the energy supplied by the external heat source or sources and utilized in the vaporization or superheating of the portions of the warmed working fluid goes directly into these vaporization and superheating steps. That is, very little if any of the heat supplied by the external or supplemental heat sources is required for the preheating of the working fluid. Those skilled in the art will therefore recognize that the efficiency of the power generation or power conversion of the external heat into recovered energy is very high as compared to many conventional power generation cycles such as the public utility electric generating plants. Therefore in the subject process the efficiency of power generation by the heat supplied by the external heat sources, which may be measured in such terms as BTU/kilowatt hour, is above that of most public utilities. This high efficiency is a significant advantage of the subject invention and basically results from the ability to utilize an increased portion of the low level heat present in the overhead stream of the fractionation column.

The subject method is further illustrated by the following calculated results of applying the method to a commercial fractionation column. The feed stream to the column is a hydrocarbon mixture (the effluent from a fluid catalytic cracking reactor) comprising unconverted distillates, cracked gasoline and gases. The less volatile distillate is concentrated into a net bottoms stream. An overhead vapor stream comprising gasoline and gases is removed from the top of the column at a temperature of about 280° F. (138° C.) and a pressure of approximately 25 psig. This stream has a flow rate of about 565,000 lbs/hr. The overhead vapor stream is passed through the first heat exchanger (vaporizer) and merges at a temperature near 260° F. (127° C.). The overhead stream is then passed through the second heat exchanger or preheater. This produces an overhead liquid stream, with uncondensed gaseous hydrocarbons, having a temperature of approximately 120° F. (49° C.). The overhead liquid portion is collected in a receiver and divided into a net overhead liquid stream having a flow rate of about 190,000 lbs/hr, a reflux liquid stream which is passed into the top of the column, and an uncondensed gas stream of about 180,000 lbs/hr.

A working fluid stream comprising 937,000 lbs/hr of high purity isobutane is removed from a surge drum and pumped into the second heat exchanger wherein it is heated to about 250° F. (121° C.). the warm working fluid stream is then divided into a first stream having a flow rate of approximately 392,000 lbs/hr and a second stream of equal composition. The first stream of working fluid is passed through the vaporizer (first heat exchanger) and therein substantially vaporized. The second stream of working fluid is passed through a different vaporizer and vaporized by heat from the external source. The vapor streams removed from the two vaporizers are then combined to form a vapor stream having a temperature of about 250° F. (121° C.) and a pressure near 410 psig. This vapor stream is depressurized in an expansion turbine which drives an electrical generator thereby producing about 4950 kw/hr of electrical energy. The vaporous working fluid leaving the turbine has a pressure of about 57 psig and is passed through a condenser wherein it is condensed. The resultant liquid phase working fluid is then collected in the surge drum at a temperature of approximately 100° F. (38° C.).

I claim as my invention:

1. A method of vaporizing a liquid stream which comprises the steps of:
   (a) heating a first liquid stream by indirect heat exchange against a hereinafter characterized warm fluid stream;
   (b) dividing the first liquid stream into a second liquid stream and a third liquid stream;
   (c) vaporizing substantially all of the second liquid stream by indirect heat exchange against the overhead vapor stream of a fractionation column, with the overhead vapor stream thereby being converted into the previously referred to warm fluid stream; and,
   (d) vaporizing substantially all of the third liquid stream by indirect heat exchange against a heat source other than the overhead vapor stream of the fractionation column.

2. The method of claim 1 further characterized in that the first liquid stream is heated to within 15 Centigrade degrees of the temperature at which the second liquid stream is vaporized.

3. The method of claim 1 further characterized in that vapors formed by the substantial vaporization of the second and third liquid streams are combined into a single vapor stream.

4. The method of claim 3 further characterized in that the first liquid stream comprises a power cycle working fluid and comprises liquid formed by the condensation of vapors formed by the substantial vaporization of the second liquid stream.

5. A process for recovering energy from the overhead stream of a fractionation column which comprises the steps of:
   (a) heating a liquid-phase feed stream of an expansion turbine working fluid by indirect heat exchange against the overhead stream of the fractionation column;
   (b) dividing the thus-heated liquid-phase feed stream of working fluid into a first stream and a second stream;
   (c) vaporizing at least a portion of said first stream of working fluid by indirect heat exchange against the overhead stream of the fractionation column at a point upstream in the flow of the overhead stream as compared to the indirect heat exchange of step (a); and,
   (d) depressurizing the resultant vapor phase working fluid in an expansion turbine.

6. The process of claim 5 further characterized in that at least a part of the second stream of working fluid is vaporized by indirect heat exchange against a heat source other than the overhead stream of the fractionation column and the additional resultant vapor phase working fluid is then depressurized in the expansion turbine.

7. A method of recovering energy from the overhead vapor stream of a fractionation column which comprises the steps of:
   (a) cooling the overhead stream by at least partially vaporizing a first turbine working fluid stream by indirect heat exchange in a first heat exchanger;
   (b) removing an additional amount of heat from the overhead stream by heating a larger second turbine working fluid stream which comprises the first turbine working fluid stream by indirect heat exchange in a second heat exchanger; and,
   (c) depressurizing the first turbine working fluid stream in an expansion turbine.

8. The method of claim 7 further characterized in that the first turbine working fluid stream is formed by dividing the second turbine working fluid stream into a number of aliquot portions which are heated in separate heat exchange means.

9. The method of claim 8 further characterized in that each aliquot portion of the second turbine working stream is at least partially vaporized by indirect heat exchange, with the resultant vapor being combined and passed into the expansion turbine.

10. The method of claim 8 further characterized in that the second turbine working fluid stream is also divided into a third turbine working fluid stream which is vaporized by indirect heat exchange, and in that the first and the third turbine working fluid streams are then combined.

11. The method of claim 10 further characterized in that the third turbine working fluid stream is vaporized by indirect heat exchange against a fluid stream removed from a different fractionation column.

12. The method of claim 10 further characterized in that the third turbine working fluid stream is vaporized by indirect heat exchange against a fluid stream of the same fractionation column.

* * * * *